United States Patent [19]

Kimberlin

[11] 4,420,705
[45] Dec. 13, 1983

[54] CONTACT AND TERMINAL ASSEMBLY FOR A BRUSH WEAR INDICATOR

[75] Inventor: Dan W. Kimberlin, Erie, Pa.

[73] Assignee: General Electric Company, Research Triangle Park, N.C.

[21] Appl. No.: 382,034

[22] Filed: May 26, 1982

[51] Int. Cl.$^3$ .............................................. H02K 13/00
[52] U.S. Cl. ..................................... 310/242; 310/245
[58] Field of Search .............. 310/239, 240, 241, 242, 310/244, 245, 246, 247, 231; 318/541, 542, 361; 200/61.4; 340/648, 679

[56] References Cited

U.S. PATENT DOCUMENTS

| | | | |
|---|---|---|---|
| 3,526,797 | 9/1970 | Jueschke | 310/245 |
| 4,172,988 | 10/1979 | Lowther | 310/245 |
| 4,272,695 | 6/1981 | Buchwald et al. | 310/242 |
| 4,329,683 | 6/1982 | Kimberlin | 310/242 |
| 4,344,009 | 8/1982 | Reynolds | 318/542 |
| 4,348,608 | 9/1982 | Michael | 310/242 |
| 4,355,254 | 10/1982 | Oki et al. | 310/239 |

FOREIGN PATENT DOCUMENTS 1300951 12/1972 United Kingdom ................ 310/245

*Primary Examiner*—R. Skudy
*Attorney, Agent, or Firm*—I. M. Freedman; V. P. Myles

[57] ABSTRACT

A brush wear indicator contact and terminal assembly having a high pressure-per-unit contactor that is formed on a first surface of the plate. A conductor for a brush wear indicator circuit is bonded to the contact plate by a high temperature resistant solder or brazing material and the contact plate is bonded to the surface of the dielectric sheet, which electrically isolates the contact from the spring when the spring is in an extended condition. By the method of the invention, a brush wear indicator contact and terminal assembly is made by adhering a sheet of dielectric material to a brush follower spring with a coating of permanently flexible adhesive, and by bonding a conductor for a brush wear indicator circuit to a contact plate having a contactor ridge on one opposite surface thereof. The contact plate is then bonded to the surface of the dielectric sheet that faces away from the brush follower spring, to arrange the contactor ridge so it makes high pressure-per-unit engagement with a coiled portion of the brush follower spring, thereby to complete a brush wear indicating signal circuit responsive to the occurrence of a predetermined degree of brush wear.

8 Claims, 5 Drawing Figures

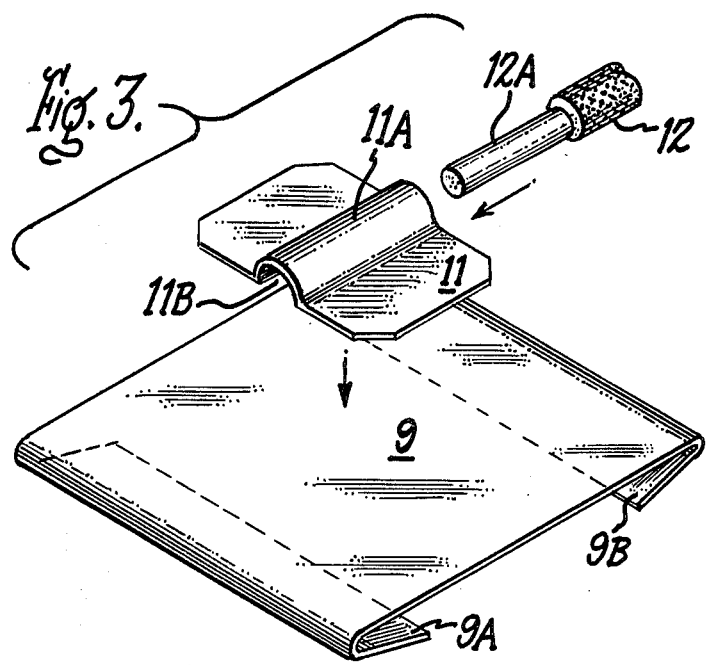
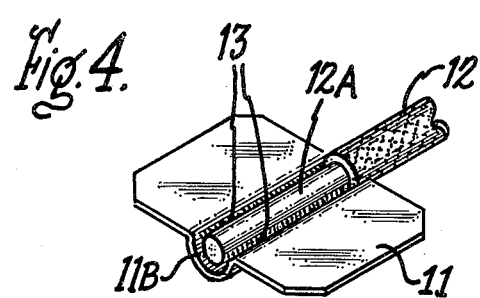

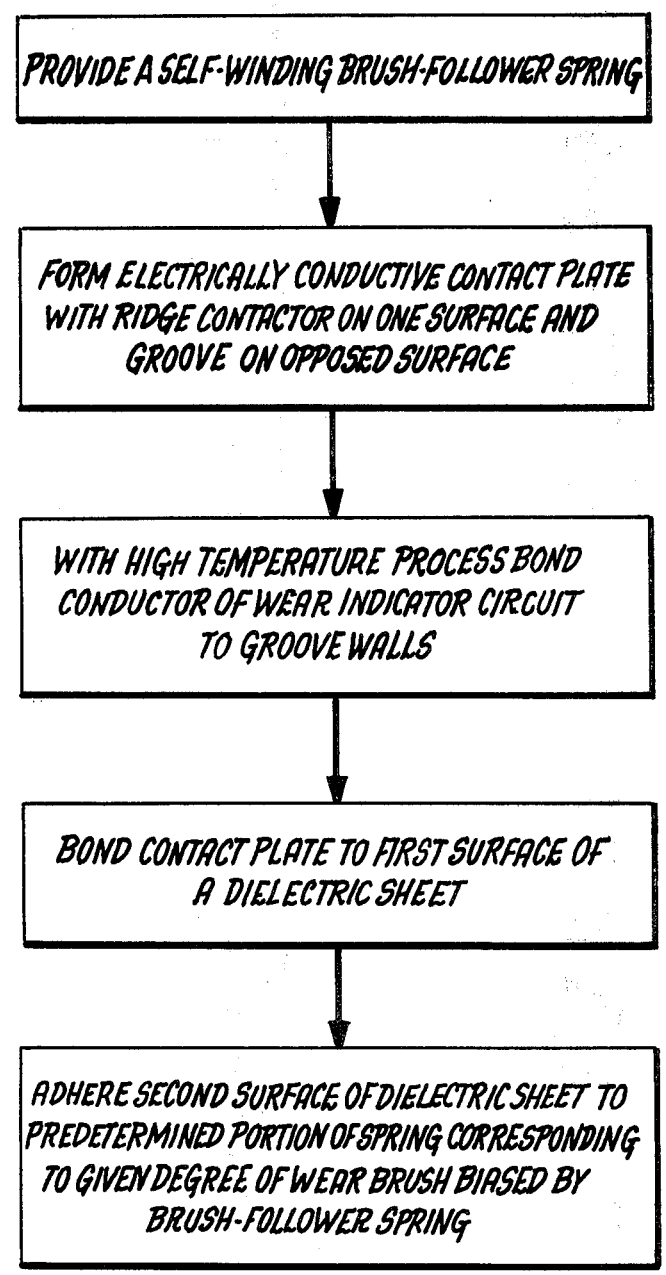

CONTACT AND TERMINAL ASSEMBLY FOR A BRUSH WEAR INDICATOR

BACKGROUND OF THE INVENTION

The invention relates to brush wear indicator assemblies for use with dynamoelectric machines to sense a predetermined degree of brush wear and signal the occurrence of such wear to an operator. More particularly, the invention relates to a contact and terminal assembly for a brush wear indicator that is typically operated in environments that subject the assembly to severe mechanical stresses and relatively high temperatures.

In many applications of dynamoelectric machines utilizing carbon brushes it is desirable to provide some means for indicating when the brushes on the machines become sufficiently worn to warrant their replacement before they either fail to adequately conduct current or before embedded conductors in the brushes are forced into contact with the slip-ring or commutator on which the brushes ride. A considerable variety of such brush wear indicator mechanisms are described in my copending U.S. patent application Ser. No. 183,904, which was filed Sept. 4, 1980, and issued as U.S. Pat. No. 4,329,683. Another copending U.S. patent application, Ser. No. 183,920, also filed Sept. 4, 1980, and issued as U.S. Pat. No. 4,348,608, discusses several alternative types of prior art brush wear indicator devices. In addition, this latter patent discloses a brush wear indicator in which a pre-stressed spring of volute construction is used to actuate a brush wear indicating signal circuit by moving a coiled portion of the spring into engagement with a relatively fixed electrical terminal of a signal circuit, thereby to energize the signal circuit with current flowing through the spring into the fixed terminal. Thus, as shown by that patent, it is already known in the brush wear indicator field that a brush biasing spring can be suitably employed as an electrical contactor for energizing a signal circuit. Moreover, it has been recognized that a terminal of a brush wear indicator circuit can be mounted in fixed relationship on, or immediately adjacent to, a fixed end of such a spring, thereby to position the terminal in the path of movement of the coiled portion of the spring.

It has also been found that the type of rigid terminal assemblies and associated bonding and insulating materials and processes used in making the kind of structure described in the patent last mentioned above, often result in the brush-follower spring constant being undesirably varied. Specifically, such rigid terminal members impede the tendency of the spring to bend or coil, and if high temperature processes, such as soldering or brazing are used to bond the terminal to the brush-follower spring, the heat of the process relaxes the spring. Such undesirable variations in the spring constant limit the spectrum of applications for which rigid terminal assemblies are suitable; consequently, a recognized desirable objective is to provide an improved terminal and contact assembly that will make more feasible to use a brush-biasing spring as a circuit-closing contactor for a brush wear indicating circuit.

Another desirable improvement for such a contact and terminal assembly for brush wear indicators would be to provide some suitable means for assuring positive engagement of a brush wear signal circuit contactor at a precisely determinable point in the path of movement of the coiled portion of a brush biasing spring as it winds up. The advantage of being able to so precisely determine a given point in the movement of the brush-biasing spring is that it then becomes possible to accurately detect and signal a preselected degree of wear of a brush that is biased against a running surface by the spring.

In addition to overcoming the problem of inducing changes in the spring constant by mounting a terminal and associated insulating member on a brush-biasing spring, it is necessary in the manufacture of contact and terminal assemblies for such brush wear indicators to employ methods and materials that are suitable for the relatively high temperatures, and mechanical stresses that are often encounted in typical dynamoelectric machine brush applications. In particular, where adhesive materials are used in the manufacturing processes, it is necessary to preserve desired characteristics such as reliable intercomponent bonding and long-lasting flexibility of parts of the assembly, in order to avoid fatigue failures during the anticipated long life of such assemblies. Moreover, reliability of the electrical signal indicating and conducting components of brush wear contact and terminal assemblies is important due to the nature of the warning function required from such apparatus.

It has been found that the reliability of contact and terminal assemblies for brush wear indicators can be significantly improved by practicing certain novel method steps in their manufacture. In the present invention, such method steps are selected and arranged to result in the manufacture of assemblies that are capable of performing in relatively high temperature environments without loss of any of the desired characteristic features of the components of the assembly and without undue distortion of the spring constant of an associated brush biasing spring on which the assembly is applied.

OBJECTS OF THE INVENTION

It is an object of the invention to provide a brush wear indicator contact and terminal assembly that is commercially feasible to manufacture, and that performs reliably and accurately when mounted in operating relationship on a commercially available dynamoelectric machine brush biasing spring.

Another object of the invention is to provide a brush wear indicator contact and terminal assembly that is rugged in construction, and that is operable in ambient temperatures in excess of 200° C. without undergoing undesirable changes in the flexibility and adhesive characteristics of its components.

Still another object of the invention is to provide a high temperature contact and terminal assembly in which a flexible contact plate is soldered at high temperature to a conductor of a brush wear indicator circuit and is bonded to a flexible sheet of dielectric material, which in turn is adhered to, and bends with, a self-winding spring of a dynamoelectric machine brush holder assembly.

A still further object of the invention is to provide a rugged and reliable high temperature contact and terminal assembly for a brush wear indicator assembly wherein the contact provides a definite high pressure per-unit point of engagement with a coiled portion of a brush-biasing spring, thereby to positively energize a brush wear indicator signal circuit at a precisely determined point in the path of movement of the spring, which point corresponds to a pre-selected degree of wear of the brush.

A further object of the invention is to provide a method for making a contact and terminal assembly for a brush wear indicator whereby a high temperature solder connection is made between a brush wear indicator circuit conductor and a contact and terminal member before the member is secured in operating relationship to a self-winding spring of a brush holder assembly.

Another object of the invention is to provide a method for making a brush wear indicator contact and terminal assembly that includes a high per-unit-pressure contact that is mounted in a precisely determined position on a self-winding, brush-biasing spring, thereby to arrange the contact to be engaged by the coiled portion of the spring as an accurately determined measure of the occurrence of a given degree of brush wear.

Additional objects and advantages of the invention will become apparent to those skilled in the art from the description of it presented herein, considered in conjunction with the accompanying drawings.

SUMMARY OF THE INVENTION

In one preferred embodiment of the invention a brush wear indicator contact and terminal assembly for use with a self-winding, brush-follower spring of a dynamoelectric machine brush holder, is characterized by including a contact plate having a high pressure-per-unit contact surface thereon and by having a conductor of a brush wear indicator circuit bonded thereto with a high temperature bonding process. The assembly is further characterized by including a flexible sheet of dielectric material that is adhered to the surface of the self-winding spring by a flexible adhesive material that maintains its flexibility and adhesiveness at relatively high temperatures of the type encountered in commercial dynamoelectric machine brush applications. In the preferred method of the invention, the contact and terminal assembly is made by using a high-temperature soldering process to bond a conductor of a brush wear indicator signal circuit to a contact plate having a groove formed in one surface thereof and having a contact-defining ridge formed on an opposite surface thereof. The contact plate is then bonded to a sheet of dielectric material, which is subsequently adhered to an inner surface of a selfwinding spring of a dynamoelectric machine brush holder apparatus. The dielectric sheet of material is made to be of sufficient size to electrically isolate the contact from the spring when the coiled portion of the spring is in its fully extended position.

BRIEF DESCRIPTION OF THE DRAWINGS

FIG. 3 is an exploded, perspective and enlarged view of some of the major components of the contact and terminal assembly illustrated in FIG. 2.

FIG. 4 is an enlarged perspective view of a contact plate component of the assembly shown in FIG. 2, illustrating it in assembled relationship with a conductor of a brush wear indicator signalling circuit to which the plate is bonded with a high temperature solder, according to the invention.

FIG. 5 is a flow diagram of preferred steps of the method of the invention.

DESCRIPTION OF THE PREFERRED EMBODIMENTS

Figure 1:
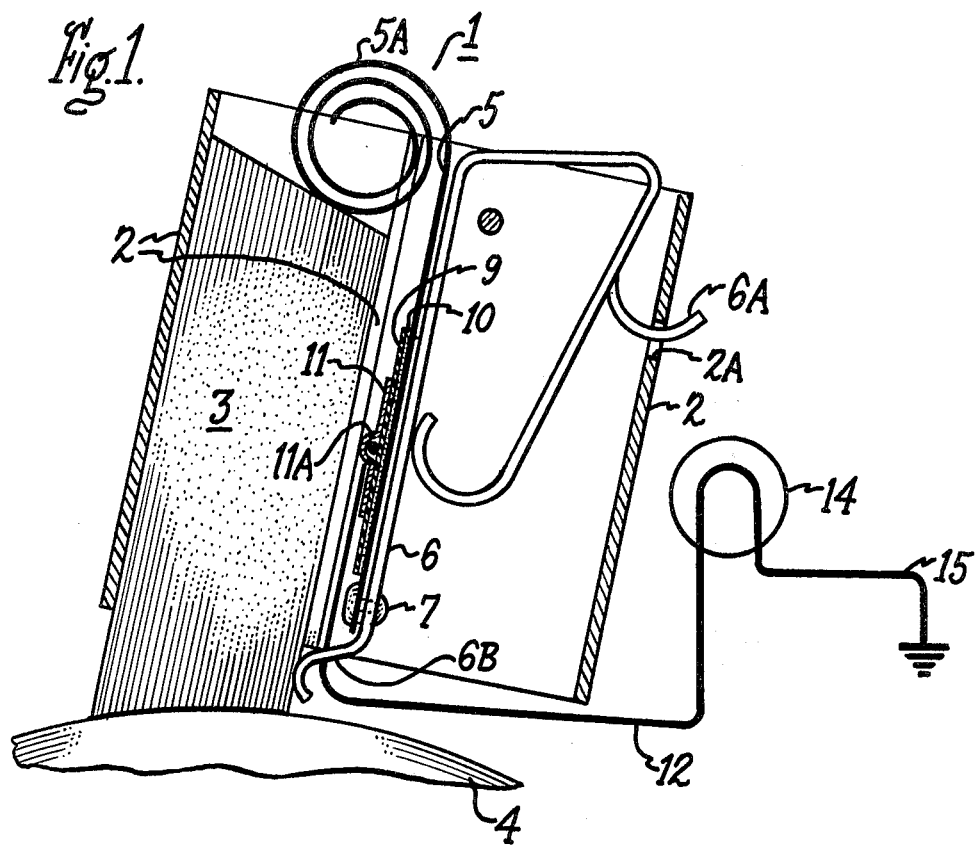
FIG. 1 is a side elevation, partly in cross-section, of a brush wear indicator contact and terminal assembly constructed according to the present invention and shown in operating relationship to a dynamoelectric machine slip-ring on which a brush is supported in conductive relationship by a brush holder apparatus that includes a self-winding, brush-follower spring which is arranged to operate as an electrical contactor to engage the contact of said assembly, responsive to the occurrence of a predetermined degree of wear of the brush.

At the outset it should be understood that the invention is suitable for use in combination with a wide variety of different types of commercially available brush holder structures of the types commonly used for holding carbon brushes in operating position against a slip ring, commutator, or other running surface of a dynamoelectric machine. One type of such a commercially available brush holder 1 is shown in FIG. 1 where a rigid metal brush holder housing 2 having a carbon brush 3 slidably mounted therein is positioned in operating relationship to a slip-ring 4, which it will be understood may be a conventional commutator or other conductive member on which the brush 3 is adapted to ride in a conductive relationship. The structure of brush holder 1 also includes a self-winding brush-follower spring 5 that has a prestressed volute coil portion 5A which rides on the upper end of the brush 3 to bias the brush toward the slip-ring 4, thereby to maintain the conductive relationship between those two members in normal operation of the dynamoelectric machine. A spring support 6 is pivotally supported by an arm portion 6A thereof, which extends through an aperture 2A in a rear wall of the brush holder housing 2. When assembled in operating position as is the case with the arrangement in FIG. 1, the resilient biasing action of the coiled portion 5A of spring 5 on the upper end of brush 3 causes the spring holder 6 to pivot around the arm 6A, to force the lower end 6B of the spring holder against the bottom side wall of the brush 3. For those wishing a further description of the functions of brush holder 1, a somewhat similar brush holder and spring assembly is described in detail, and the operation thereof is more fully set forth, in U.S. Pat. No. 3,526,797, which issued on Sept. 1, 1970 and is assigned to the assignee of the present invention. Finally, the illustrated brush holder structure includes a rivet 7 mounted in apertures through the lower uncoiled end of the spring 5 and the lower end of the spring holder 6 to secure those components of the structure in relatively fixed position to one another. Thus, it should be understood that as the spring 5 winds up, responsive to normal wear of the brush 3 as it slides on the slip ring 4, the coiled portion 5A of the spring will move downward and cause the lower end portion of the spring 5 to bend slightly along its entire length, except for the portion of the spring that is firmly secured by the rivet 7 to the spring holder 6.

The brush wear indicator contact and terminal assembly 8 (also shown in FIG. 2), comprises a sheet of flexible dielectric material 9 that is fastened to the spring 5, adjacent to the end thereof secured by rivet 7, by a coating 10 of flexible, high temperature resistent adhesive that is disposed between and adhered to the sheet 9 and the spring 5. Because the dielectric sheet 9 must be maintained in a precisely preselected fixed relationship to the uncoiled end of the spring 5 in practicing the invention, the coating 10 must retain both its flexibility and adhesivity when exposed to relatively high temperatures, such as those in the range of 200° C. to 225° C., which may be encountered in many commercial applications of the invention on dynamoelectric machine brush holder structures. A suitable adhesive for making the coating 10 has been found to be a fluoroelastomer, which is commercially available under the trade name Viton from the E.I. DuPont de Nemours Company of Wilmington, Del., or equivalents available commercially from Minnesota Mining & Manufacturing Co., of St. Paul, Minn. It should be understood that the sheet of material 9, the coating 10 and the contact plate 11 are, for the sake of clarity, shown in the drawing figures as being substantially thicker than they would be made as components of the invention. For example, the plate 11 is preferably made about 1 to 2 mils thick and the sheet 9 is preferably also about 2 mils thick, whereas the coating 10 should be made only thick enough to afford the desired force of adhesion.

Figure 2:
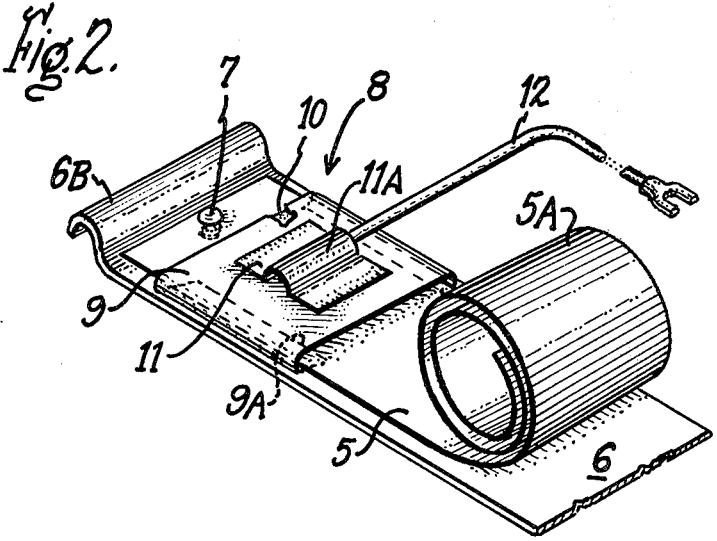
FIG. 2 is a perspective view of the contact and terminal assembly illustrated in FIG. 1, shown mounted in operating relationship on a fragment of the self-winding spring that is also depicted in FIG. 1.

The assembly 8 further comprises a generally flat, bendable contact plate 11 that is provided with a ridge 11A on a first surface, in this case on the upper surface of the plate as it is seen in FIG. 2. The contact plate also has a groove 11B (see FIGS. 3 and 4) on a second surface thereof, which is the bottom surface of the plate as it is depicted in FIG. 2. The groove 11B is adapted to receive an electrical conductor of a brush wear signal circuit in it. Such a conductor 12 is shown in FIGS. 1–4, and is best seen in FIGS. 2–4 as having a predetermined part 12A that is stripped of insulation and mounted in the groove 11A so that it is in good electrically conducting relationship to the contact plate 11.

In order to assure such good electrical contact between the plate 11 and the stripped portion 12A of the brush wear signal circuit conductor 12, the walls of the groove 11A are at least partially crimped against the end of conductor. In addition, according to the invention, the conductor 12A is further mounted in electrically conducting relationship to the contact plate 11 by being bonded thereto with a body of high temperature solder 13 that is disposed in the groove and bonded to its walls and to the conductor 12A, as best seen in FIG. 4. It should be recognized that in some modifications of the invention the solder 13 may be replaced by a high-temperature brazing material, or other suitable bonding means for forming a good electrical engagement between the conductor 12A and the plate 11.

According to the invention, the contact plate 11 is mounted in fixed relation to both the dielectric sheet 9 and the uncoiled end of the spring 5, as shown in FIGS. 1 and 2. In this arrangement the groove 11A in the plate faces the dielectric sheet 9 and the ridge 11A is positioned in the path of movement of the coiled portion 5A of the spring so that the ridge is engaged by the coil 5A responsive to the spring winding up and moving the coil a predetermined distance toward the fixed end of the spring. Such movement of the coiled portion of the spring causes the coil 5A to be biased as a contactor into high pressure-per-unit contact with the relatively narrow ridge 11A on the contact 11, thereby to complete an electrical circuit that connects the brush 3, the spring support 6 and spring 5 to the electrical conductor 12 of the brush wear indicator circuit. To help better orient the reader with respect to such a brush wear indicating function, one suitable type of simple brush wear indicator circuit is shown in FIG. 1 as including the conductor 12 connected in series with an indicating lamp 14, which is grounded through another conductor 15. The operation of such a circuit is further described in the above referenced U.S. Pat. Application Ser. No. 183,920, now U.S. Pat. No. 4,348,608.

It will be seen that with this structure of the assembly 8, the sheet 9 of dielectric material is effective to electrically isolate the contact plate 11 from the spring 5 whenever the spring is extended to move the coil 5A to a disengaged position relative to the ridge 11A on the contact plate.

Now that the basic structural features of the contact and terminal assembly 8 of the invention have been described, some additional important aspects of the embodiment of the invention disclosed herein, will be further explained. In this form of the invention, the contact plate 11 is mounted in fixed relation to the sheet 9 of dielectric material by being bonded to it with a suitable cured adhesive; such as one of the commercially available adhesives described in the penultimate paragraph of the specification portion of this application. Kapton insulation, commercially available in 2 mil thick sheets from E. I. DuPont de Nemours Company, has been found to be a suitable polymide material for making the sheet 9 of this embodiment. The sheet 9 of dielectric material is adapted to bend freely, responsive to the spring 5 winding up, thus, the resin selected for bonding the contact 11 to the sheet 9 must be capable of withstanding such bending action without breaking that bonded relationship. As can be seen in FIG. 2, the sheet 9 of dielectric material is substantially larger in surface area than the plate contact 11. Accordingly, the sheet 9 extends beyond all of the edges of the contact plate 11 so that it forms an insulating barrier that has at least a predetermined length of electrical creep path between the contact plate and the uncoiled end of the spring 5. That creep path must be sufficient to prevent the voltage present on the spring 5, which is essentially the same voltage as is present on the brush 3 and the associated slip-ring 4, from arcing over to the contact plate 11, even when dust or other contaminants of the kinds often found in the environments of dynamoelectric machine brushes is present on the surface of the dielectric sheet 9.

In order to securely fix the sheet of dielectric material 9 in fixed relationship to the spring 5, the two outer side portions 9A and 9B (see FIG. 3) of the sheet 9 are folded around the outer edges of the spring 5, as seen in FIG. 2. That arrangement provides a large surface area for the adhesive coating 10 disposed over substantially all of the surface area of the sheet 9, including the side portions 9A and 9B which is in contact with both sides of the spring 5, thereby to assure a good mechanical bond between these components of the assembly 8. Furthermore, this folded arrangement of the portion 9A and 9B of sheet 9 increases the electrical creep path from the contact plate 11 to the spring 5, and also increases the mechanical peal strength of the adhesive bond between the sheet 9 and the spring 5.

Finally, it will be recognized that the groove 11A of the contact plate 11 may be made in various different configurations and oriented in different relationships to the coiled portion 5A of the spring; however, in the preferred embodiment, the longest axis of the ridge 11A is arranged generally transverse to the path of movement of the coiled portion 5A of the spring as it winds up. That arrangement enables the ridge 11A to afford the desired high per-unit-pressure contact with the curved surface of the coiled portion 5A of the spring, thereby to establish a firm positive electrical conducting engagement between those members, responsive to the coil 5A moving into engagement with the ridge 11A on contact plate 11, as a given degree of brush wear is achieved. It should be understood that such a predetermined degree of brush wear is precisely determinable by selecting the position on spring 5 to which the contact plate 11 and the dielectric sheet 9 are fixed relative to the lower end of the spring 5 and the associated spring holder 6, as best seen in FIG. 1.

It is believed that the operation of the invention will be apparent to those skilled in the art from the description of it structure as explained above; however, before the method of the invention is explained, a brief summary of that operation will be given here. As seen in FIGS. 1 and 2, when a relatively new brush is mounted in operating relationship in brush holder housing 2, so that it rides on a slip-ring 4, the spring 5 is extended to make the coiled portion 5A thereof ride in brush-follower relationship on the upper end of the brush. That arrangement disengages the coil 5A from the ridge 11A on contact plate 11 of the contact and terminal assembly 8. As the brush 3 becomes worn due to its sliding engagement with the slip ring 4, the brush follower spring 5 forces the brush downward in the brush holder housing 2 and the spring winds up on the coiled portion 5A thereof. Eventually, depending upon the predetermined position at which the contact plate ridge 11A is mounted on the spring 5, in relation to the brush 3, a degree of brush wear occurs such that the coiled portion 5A of the spring moves into engagement with the ridge 11A of the contact plate, thereby to form a high pressure-per-unit electrical connection between the coil 5A and the crest of ridge 11A. Such engagement completes an electrical circuit from the slip-ring 4 through the brush 3 and the spring 5 to the contact plate and the conductor 12 bonded to it. Completion of that circuit results in energization of the signal lamp 14 thus indicating to an operator that the predetermined degree of brush wear has occurred. With that warning signal, he will know that the brush should be replaced before significant additional wear occurs to either cause the brush to fail to make firm electrical contact with the slip-ring 4, or to produce undesirable wear of the slip-ring due to embedded pigtail type conductors in the brush 3 being driven into wearing relationship with the slip-ring.

In practicing the method of the invention to manufacture a brush wear indicator contact and terminal assembly for use with a brush holder having a self-winding spring, such as the spring 5 described above, it is first necessary to provide a suitable sheet of dielectric material, such as the sheet 9. As noted above, I found that a suitable commercially available polymide film material for this purpose is Kapton insulating material, which is available from E. I. DuPont de Nemours Company of Wilmington, Del. Next, a flexible contact plate which may be made of thin spring brass, or copper, i.e., such a strip of metal approximately 1 to 2 mils in thickness, is cut to have a size substantially smaller than that of the area of the dielectric sheet, and is bent or otherwise suitably formed to define a ridge in one surface thereof and a groove in an opposite surface thereof for receiving a conductor of a brush wear indicator circuit in the groove. A conductor of a brush wear indicator circuit is suitably stripped or otherwise prepared for forming a good electrical engagement with the contact plate, then that stripped portion of the conductor is placed in the groove and the walls of the groove are crimped against the conductor. A high temperature resistant bonding material, such as a solder bonded to the conductor and the contact plate to form a good mechanical and electrical bond between those members. Next, the contact plate is bonded under suitable pressure to a first surface of the sheet of dielectric material with an adhesive or other suitable vibration and temperature resistant bonding material. A suitable adhesive for this purpose is a commercially available fluoroelastomer, such as Viton, or 77-C, the sources of both of which are noted at the end of this paragraph. Adequate pressure for effecting the bond is fifty pounds per square inch. Finally, the sheet of dielectric material is wrapped around the sides of the brush biasing spring, in the manner shown generally in FIG. 2, and a coating of flexible, high-temperature resistant adhesive is disposed between the dielectric sheet over the entire surface area thereof that is in engagement with the spring, in order to form a secure adhesive bond between the spring and the second surface of the sheet that is against the spring. A suitable coating material for that purpose is a fluoroelastomer, such as that sold under the trade name Viton, which is commercially available from E. I. DuPont de Nemours & Company. An alternative commercial source of such a suitable fluoroelastomer is David Hudson, Inc. of Stow, Ohio, which sells such material under its trade name 77-C.

From the foregoing description of the invention, it will be apparent that various modifications and alternative embodiments of it may be developed, based upon the disclosure and teachings herein, thus, it is my intention to encompass within the limits of the following claims the true scope and spirit of the invention.

I claim:

1. A brush wear indicator contact and terminal assembly, for use with a self-winding brush-follower spring having a coil portion that operates as a contactor to complete an electrical circuit with the assembly thereby to actuate a signal responsive to the occurrence of a predetermined degree of brush wear, comprising, a sheet of flexible dielectric material fastened to said spring adjacent the uncoiled end thereof, a generally flat, bendable contact plate having a ridge on a first surface thereof and having a groove on a second surface thereof, said groove being adapted to receive an electrical conductor therein, an electrical conductor having a predetermined part thereof mounted in said groove and in electrical conducting relationship to the contact plate, said contact plate being mounted in fixed relation to said sheet of dielectric material and to the uncoiled end of said spring, with the groove in the plate facing said sheet to position the ridge on the contact plate in the path of movement of the coil portion of the spring so that the ridge is engaged by the coil responsive to the spring winding up and moving the coil a predetermined distance toward the fixed end of the spring, thereby to electrically connect the spring to said electrical conductor, said sheet of dielectric material being effective to electrically isolate the contact plate from the spring responsive to said coil being disengaged from said ridge.

2. An invention as defined in claim 1 wherein said contact plate is mounted in fixed relation to the sheet of dielectric material by being bonded to it, and wherein said sheet of dielectric material is adapted to bend in response to said spring winding up.

3. An invention as defined in claim 2 wherein said conductor is mounted in electrically conducting relationship to the contact plate by a body of solder disposed in said groove and bonded to the contact plate and to the conductor.

4. An invention as defined in claim 2 wherein said contact plate and said sheet of dielectric material are fastened in fixed relation to the uncoiled end of said spring by a coating of flexible, high-temperature resistant adhesive that is disposed between and adhered to said sheet and said spring, and wherein said sheet of dielectric material is adapted to bend and conform to the surface of the spring responsive to said spring winding up.

5. An invention as defined in claim 1 wherein said sheet of dielectric material is larger in surface area than said contact plate and extends beyond all of the edges of the plate, thereby to form an insulating barrier with at least a predetermined length of electrical creep path between the contact plate and the uncoiled end of said spring.

6. An invention as defined in claim 5 wherein said sheet of dielectric material has two of its ends wrapped around the edges of the spring so that said ends of the dielectric sheet are adhered to the side of the spring opposite to the side thereof that is closest to the contact plate.

7. An invention as defined in claim 5 wherein the longest axis of said ridge is generally transverse to the path of movement of the coiled portion of said spring as it winds up.

8. An invention as defined in claim 3 wherein the walls of said groove are at least partially crimped against said conductor to help secure the conductor in said electrically conducting relationship to the contact plate.

* * * * *